(No Model.)
W. V. ESMOND.
ROLL HOLDER CAMERA AND PICTURE EXHIBITOR.
No. 542,334. Patented July 9, 1895.
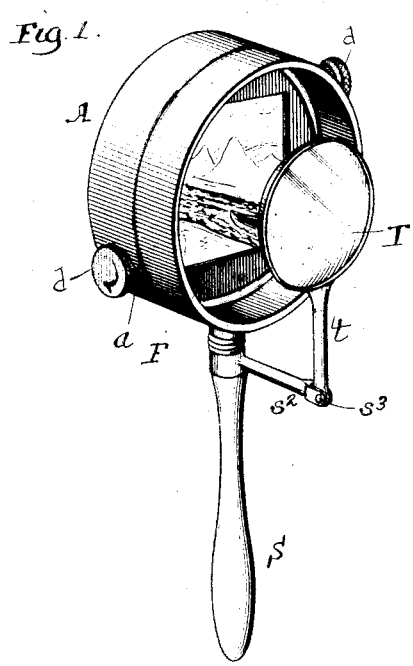
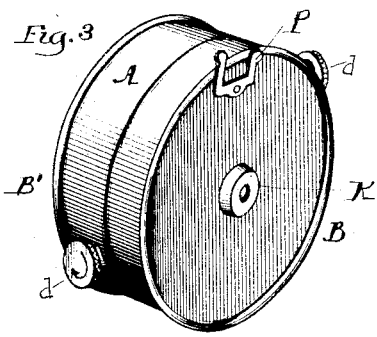
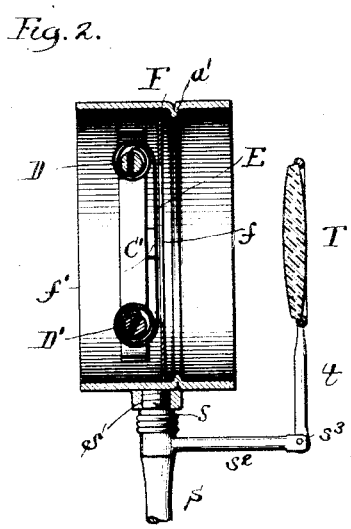
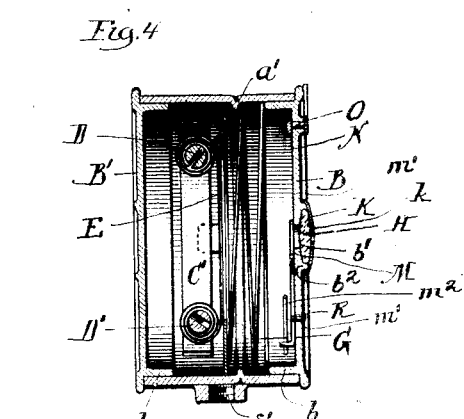
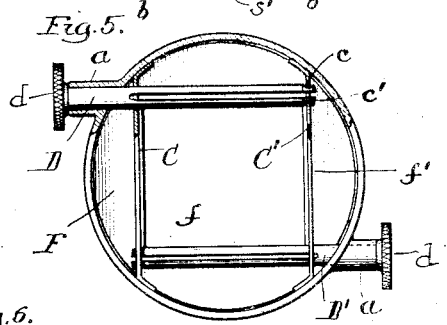
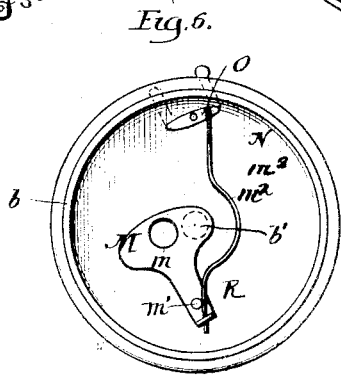
Witnesses:
Fred Gerlach
Alberta Adamick
Inventor:
W. V. Esmond
By Pira & Fisher
Attorneys.

UNITED STATES PATENT OFFICE.

WILLIAM V. ESMOND, OF CHICAGO, ILLINOIS, ASSIGNOR, BY DIRECT AND MESNE ASSIGNMENTS, TO C. B. SIMS AND JOSEPH UHRIG, OF SAME PLACE.

ROLL-HOLDER CAMERA AND PICTURE-EXHIBITOR.

SPECIFICATION forming part of Letters Patent No. 542,334, dated July 9, 1895.

Application filed November 30, 1894. Serial No. 530,323. (No model.)

*To all whom it may concern:*

Be it known that I, WILLIAM V. ESMOND, a citizen of the United States, residing at Chicago, Cook county, Illinois, have invented certain new and useful Improvements in a Combined Photographic Camera and Picture-Exhibitor, of which I do declare the following to be a full, clear, and exact description, reference being had to the accompanying drawings, forming a part of this specification.

My present invention has for its object to provide a simple, cheap, compact, and effective construction of combined camera and picture-exhibitor by means of which not only may photographs be readily taken, but by which also the developed films or negatives of such photographs or other pictures can be readily viewed.

My invention consists in the various novel features of construction hereinafter described, illustrated in the accompanying drawings, and particularly pointed out in the claims at the end of this specification.

Figure 1 is a perspective view of my apparatus when employed as a picture-exhibitor. Fig. 2 is a view in central vertical section through Fig. 1. Fig. 3 is a perspective view of the inclosing casing of the camera. Fig. 4 is a view in central vertical section through the camera, as shown in Fig. 3. Fig. 5 is a back view, the back plate being removed and the parts being shown in section to illustrate the manner of journaling the film-rollers. Fig. 6 is an inner face view of the front plate of the camera with shutter thereon.

The body or case A of the camera is preferably, although not necessarily, of cylindrical shape, and the ends of this body or case are closed by the front plate B and the back plate B', these plates being furnished with the inwardly-extending flanges $b$ to fit within the ends of the body or case A, as shown in Fig. 4 of the drawings, and thus removably hold the plates B and B' in position to tightly close the case.

Within the body or case A are fixed the vertical bars C and C', the ends of these bars being suitably connected to the interior of the body A, and through these bars are formed holes to receive the film-rollers D and D', the outer ends of which project through the case A and are furnished each with heads $d$, whereby they can be conveniently turned.

Preferably the case A has bearing hubs or sleeves $a$ extending outwardly therefrom, in order to give a more secure bearing to the rollers D and D'. The rollers D and D' are slotted, as shown, to permit the ends of the negative film to be readily held, and the inner end of each of these rollers has a peripheral notch or groove $c$ formed therein, and has a shoulder $c'$ formed upon its end in order to retain the roller in position after its end has been passed through the hole in the bar C or C'. The roller D will be placed in position by passing its end through the hub or bearing $a$ of the case A, through the hole in the upper end of the bar C, and then by compressing the roller the headed end $c'$ can be passed through the hole in the upper end of the bar C'. If the pressure upon the roller D is now relieved, the tendency of the split portions to resume their normal position will cause the parts of the inner end of the roller to bear against the walls of the hole in the upper end of the bar C', thereby affording a certain amount of friction which will guard against the accidental turning of the roller, and the enlarged head $c'$ will prevent the accidental withdrawal of the roller from the bar C'. In like manner the roller D' will be placed and held in position. It will be understood of course that the holes at the ends of the bars C and C', through which the inner ends of the rollers D and D' pass, will be considerably smaller in diameter than the body of the rollers, but sufficiently large to permit the headed ends $c'$ of the rollers to be passed through the holes when the split portions of the rollers are compressed. The ends of the sensitized film E to be carried by the rollers D and D' will be held by passing the same through the slits of the rollers, as well understood, and this film can be wound from one to the other of the rollers in order to successively expose different portions of the film, either for the purpose of making a negative or for presenting the same to be viewed as a picture. In front of the rollers D and D' is placed the mat F that is forced normally against the sensitized film by means of the coil-spring G.

The mat F is formed with an opening $f$, and the inner face of the mat F may be provided with lugs $f'$, that will engage with the vertical bars C and C', and thus prevent the accidental turning of the mat within the case. The opening in the mat F will of course determine the extent of surface of the film which will be exposed, and will protect the remainder of the film from access of light thereto. The coil-spring G, while bearing around the edges of the mat, will insure a snug pressure of the mat against the film at all points and will at the same time yield sufficiently, so as to permit one part of the mat to be forced forward as the sensitized film is turned from one of the rollers D D' onto the other. The body or case A has its interior formed with the rib or bead $a'$, that will serve not only to hold the mat in position when the front plate and the coil-spring are removed, but will also guard against the passage of light around the outer edges of the mat. The rib or bead $a'$ is preferably formed upon the interior of the case A by spinning or pressing the rib from the body of the case, as shown. The inner end of the coil-spring G bears against the mat F, and the outer end of this spring bears against the flange $b$ upon the front plate B. The front plate B has formed therein a sight opening $b'$, in front of which is placed the lens H.

The lens H is held within the annular rib $b^2$ on the outer face of the front plate B by means of a stop-plate K, the inwardly-turned edges of which fit snugly over the flange $b^2$ and thus securely retain the lens H in position. The stop-plate K serves not only as a means for retaining the lens in position, but there may be provided any desired number of stop-plates K, having different-sized apertures $k$, according to the lens employed and the exposure desired or class of work to be done.

By forming the stop-plates K to engage the rib $b^2$ of the front plate it will be seen that one lens can be quickly removed and another can be inserted, and this, too, without the necessity of the change being made in a dark room, as the shutter M is upon the interior of the front plate, while the stop-plate K holds the lens upon the exterior.

In Figs. 4 and 6 of the drawings I have shown one form of shutter that may be employed in connection with my camera; but I do not wish to be understood as making any claim in this application to such shutter.

Below its pivot $m'$ the tail of the shutter has an eye to freely receive the terminal of a bow-spring $m^2$, which extends thence and is fastened at its opposite end to an arm of the trip O, pivoted on the front plate. At the outside said plate carries on the same pivot a companion part of trip O, having lugs P, by which the trip can be manipulated. On depressing the long lug P the bow-spring $m^2$ throws shutter M about its pivot, so that openings $m$ $b'$ become coincident. By release of the trip lug or arm of bar P the spring restores the shutter to normal position.

From the foregoing description it will be seen that when it is desired to take a photograph the operator will simply depress one or the other of the arms of the bar P, so as to cause the shutter M to coincide with the sight-opening of the front plate B of the camera, the length of exposure depending upon the rapidity with which the arm P is operated. When one exposure has thus been made and the shutter M moved to proper position for closing the opening $b'$ in the front plate, the operator can, by means of the head $d$, turn one of the film-rollers D or D' so as to advance the roller in order to bring a sufficient part of the film opposite the opening $f$ in the mat F in readiness for the next exposure.

When it is desired to remove the film for development or other purpose, it can be wound completely onto one of the rollers, its end being freed from the other roller, and it afterward can be drawn off the roller onto which it has been wound. The rollers can thereafter be withdrawn or partially withdrawn by compressing them a sufficient distance to permit the heads $c'$ to pass from out the holes in the vertical bar. It will be found that the coil-spring will produce a pressure around the entire edge of the mat F, so as to snugly hold the mat against the film while permitting a yielding of the mat sufficient to enable the film to be unwound from one roller and wound onto the other. The advantage of holding the lens H by means of a stop-plate K, so that a lens can be readily changed, will be at once appreciated by any one familiar with this class of work, as it constantly become desirable to employ different lenses, according to the differences in the character of the work to be done.

When the sensitized film has been exhausted, it can be removed from the case A by withdrawing the back plate B', and when the negatives have been developed the film can be restored to the roll and the apparatus can be used for exhibiting the pictures in the manner to be next described.

The front plate B of the case will be removed and, as well, also, the coil-spring G, leaving the front and back of the case A completely open. In order to afford a better view of the negatives or other pictures carried by the holders D and D', I attach to the body of the case a handle S, carrying a lens T, adapted to be brought in front of the case A. By preference the connection between the handle S and the case A is effected by providing the upper end of the handle S with a screw-threaded portion $s$, adapted to enter a screw-threaded socket $s'$ upon the case A. The handle S has projecting therefrom an arm $s^2$, to which is pivoted, as at $s^3$, the arm $t$, that carries the lens T. It will thus be seen that when the apparatus is to be used as a picture-exhibitor the handle S will be fastened to the case A and the lens T will be turned up opposite the front of the case. My object in mounting the lens T in the manner shown is not only to enable the lens to be moved back and forth, in order to give the proper focus, but also to enable the lens to be compactly folded for arrangement in the case in which it is to be carried when not in use. By removing the front plate and back plate of the case it becomes possible for me to use a lens T for the purpose of inspecting the pictures, and as the light is freely admitted to the pictures from both front and back the case can be used as an exhibitor having pictures whether the same be transparent or opaque.

While I have described my invention as a combined camera and picture-exhibitor it is manifest that certain features of the invention can be employed without its adoption as an entirety, and it is plain, also, that the precise details of construction above set out may be varied without departing from the spirit of the invention.

Having thus described the invention, what I claim as new, and desire to secure by Letters Patent, is—

1. A combined camera and picture exhibitor comprising a case provided with a suitable lens and with suitable means for sustaining, protecting and exposing the sensitized film, said case having a removable front plate and a removable back plate, both of said plates being removable independent of the film carrying rollers and the front plate being formed with a sight opening therein, substantially as described.

2. A combined camera and picture exhibitor comprising a case provided with a suitable lens and with suitable means for sustaining, protecting and exposing the sensitized film, and having a removable front plate B provided with a flange $b$ and provided with a sight opening $b'$, and a back plate $B'$ provided with a flange $b$, said flanges serving to connect said plates with the body of the case, substantially as described.

3. A combined camera and picture exhibitor comprising a case provided with a suitable lens and with suitable means for sustaining, protecting and exposing the sensitized film, said case having a removable front plate and a removable back plate and a handle provided with a lens or magnifying glass detachably connected to said case, substantially as described.

4. A combined camera and picture exhibitor comprising a case provided with a suitable lens and with suitable means for sustaining, protecting and exposing the sensitized film, said case having a removable back plate and a removable front plate, a handle detachably connected to said case and a lens connected to said handle, in manner permitting said lens to be moved outward and from said case, substantially as described.

5. A combined camera and picture exhibitor comprising a case provided with suitable rollers for carrying a sensitized film, and provided also with a lens and with suitable means for protecting and exposing said sensitized film, of a removable front plate B provided with a sight opening, a removable back plate $B'$ and a lens T detachably connected to said case and movably mounted with respect to said case, whereby the position of said lens can be shifted to obtain the desired focus, substantially as described.

6. The combination with the case A having a detachable front plate B and back plate $B'$ and suitable rollers D and $D'$ of a handle S detachably connected to said case, a lens T and pivoted arms $t$ and $s^2$ for connecting said lens to said handle, substantially as described.

7. In a camera, the combination with a front plate having a raised rib $b^2$ about its sight opening, of a perforated stop plate K for retaining the lens in place upon said front plate, said stop plate K having at its periphery an inwardly turned flange to engage said rib $b^2$ whereby said stop plate can be readily removed when a plate having a different size of sight opening is to be employed, substantially as described.

8. In a camera the combination with a case or body, of rollers for carrying the sensitized film, one or both of said rollers being slotted lengthwise and being provided at its inner end with the headed portion $c'$ whereby the accidental withdrawal of the rollers will be prevented, substantially as described.

WILLIAM V. ESMOND.

Witnesses:
 JAMES H. PIERCE,
 ALBERTA ADAMICK.